US010834672B2

(12) United States Patent
Chen et al.

(10) Patent No.: US 10,834,672 B2
(45) Date of Patent: Nov. 10, 2020

(54) POWER MANAGEMENT OF NETWORK LINKS

(71) Applicant: International Business Machines Corporation, Armonk, NY (US)

(72) Inventors: Dong Chen, Scarsdale, NY (US); Paul W. Coteus, Yorktown, NY (US); Noel A. Eisley, Wappingers Falls, NY (US); Philip Heidelberger, Cortlandt Manor, NY (US); Robert M. Senger, Tarrytown, NY (US); Burkhard Steinmacher-Burow, Esslingen (DE); Yutaka Sugawara, Eastchester, NY (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/862,178

(22) Filed: Sep. 23, 2015

(65) Prior Publication Data
US 2017/0086151 A1 Mar. 23, 2017

(51) Int. Cl.
*H04W 52/02* (2009.01)
*H04W 52/28* (2009.01)

(52) U.S. Cl.
CPC ..... *H04W 52/0229* (2013.01); *H04W 52/286* (2013.01); *Y02D 70/00* (2018.01); *Y02D 70/12* (2018.01); *Y02D 70/122* (2018.01)

(58) Field of Classification Search
CPC ............ H04W 52/0229; H04W 52/286; Y02D 70/00; Y02D 70/12; Y02D 70/122
See application file for complete search history.

(56) References Cited

U.S. PATENT DOCUMENTS

| 7,420,990 | B2  |   | 9/2008  | Ching et al. |
|-----------|-----|---|---------|---------------------|
| 7,589,564 | B2  | * | 9/2009  | Simmons .................. G06F 1/24 326/82 |
| 7,839,878 | B2  | * | 11/2010 | Hino ...................... H04L 12/10 370/419 |
| 8,286,007 | B2  | * | 10/2012 | Diab ...................... H04L 12/10 713/300 |
| 8,495,538 | B1  |   | 7/2013  | Frost et al. |
| 8,498,534 | B2  |   | 7/2013  | Hirth et al. |

(Continued)

OTHER PUBLICATIONS

Chabarek et al.; "Power Awareness in Network Design and Routing"; IEEE; INFOCOM 2008; The 27th Conference on Computer Communications; © 2008, IEEE; pp. 1130-1138.

*Primary Examiner* — Ajay Cattunal
(74) *Attorney, Agent, or Firm* — Stephen R. Yoder; David B. Woycechowsky

(57) ABSTRACT

A first method includes determining a total length of pending packets for a network link, determining a currently preferred power mode for the network link based on the total length of pending packets for the network link, and changing a current power mode for the network link to the currently preferred power mode. A corresponding apparatus is also disclosed herein. A second method includes determining a utilization for a network link, determining a currently preferred power mode for the network link based on the utilization for the network link, and changing a current power mode for the network link to the currently preferred power mode. A corresponding apparatus is also disclosed herein.

12 Claims, 11 Drawing Sheets

(56) References Cited

U.S. PATENT DOCUMENTS

| | | | | |
|---|---|---|---|---|
| 8,578,222 B2* | 11/2013 | Chun | | H04L 1/0036 714/708 |
| 9,432,298 B1* | 8/2016 | Smith | | H04L 49/9057 |
| 2005/0100020 A1* | 5/2005 | Hata | | H04L 47/10 370/395.21 |
| 2006/0123252 A1* | 6/2006 | Vaidya | | G06F 1/324 713/300 |
| 2006/0123253 A1* | 6/2006 | Morgan | | G06F 1/324 713/300 |
| 2007/0041319 A1* | 2/2007 | Chilukoor | | H04L 47/10 370/235 |
| 2007/0043964 A1* | 2/2007 | Lim | | G06F 1/324 713/322 |
| 2009/0097401 A1* | 4/2009 | Diab | | H04L 49/20 370/230 |
| 2009/0204836 A1* | 8/2009 | Diab | | H04L 12/12 713/323 |
| 2010/0054268 A1* | 3/2010 | Divivier | | H04L 49/90 370/412 |
| 2011/0022699 A1* | 1/2011 | Powell | | G06F 1/3209 709/224 |
| 2012/0124405 A1* | 5/2012 | Diab | | H04L 12/10 713/324 |
| 2012/0287829 A1* | 11/2012 | Chang | | H04L 5/16 370/296 |
| 2013/0003540 A1 | 1/2013 | Teoh et al. | | |
| 2013/0054996 A1* | 2/2013 | Diab | | G06F 1/3278 713/323 |
| 2014/0006822 A1* | 1/2014 | Diab | | H04L 43/0894 713/322 |
| 2014/0010130 A1* | 1/2014 | Diab | | H04L 5/16 370/296 |
| 2014/0013144 A1* | 1/2014 | Nakagawa | | G06F 1/3253 713/323 |
| 2014/0093022 A1 | 4/2014 | Shi et al. | | |

\* cited by examiner

When CYLCE_COUNT = T:
$X_n = (1-A) \times C_n + A \times X_{n-1}$
CYCLE_COUNT = 0
$C_{n+1} = 0$

POWER MANAGEMENT OF NETWORK LINKS

BACKGROUND OF THE INVENTION

The present invention relates generally to the field of power management of I/O circuits and more particularly to power management of network links.

I/O power consumption has historically improved at a slower rate than CPU power consumption. Thus I/O power is expected to consume a larger fraction of the total power budget for computing systems—particularly as Exascale systems are developed.

SUMMARY

In one aspect of the present invention, a method includes determining, with a utilization monitoring circuit, a total length of pending packets for a network link, determining, with a power mode selection circuit, a currently preferred power mode for the network link based on the total length of pending packets for the network link, and changing, with the power mode selection circuit, a current power mode for the network link to the currently preferred power mode. A corresponding apparatus is also disclosed herein.

In another aspect of the present invention, a method includes determining, with a utilization monitoring circuit, a utilization for a network link, determining, with a power mode selection circuit, a currently preferred power mode for the network link based on the utilization for the network link, and changing, with the power mode selection circuit, a current power mode for the network link to the currently preferred power mode. A corresponding apparatus is also disclosed herein.

DETAILED DESCRIPTION

Figure 1A:
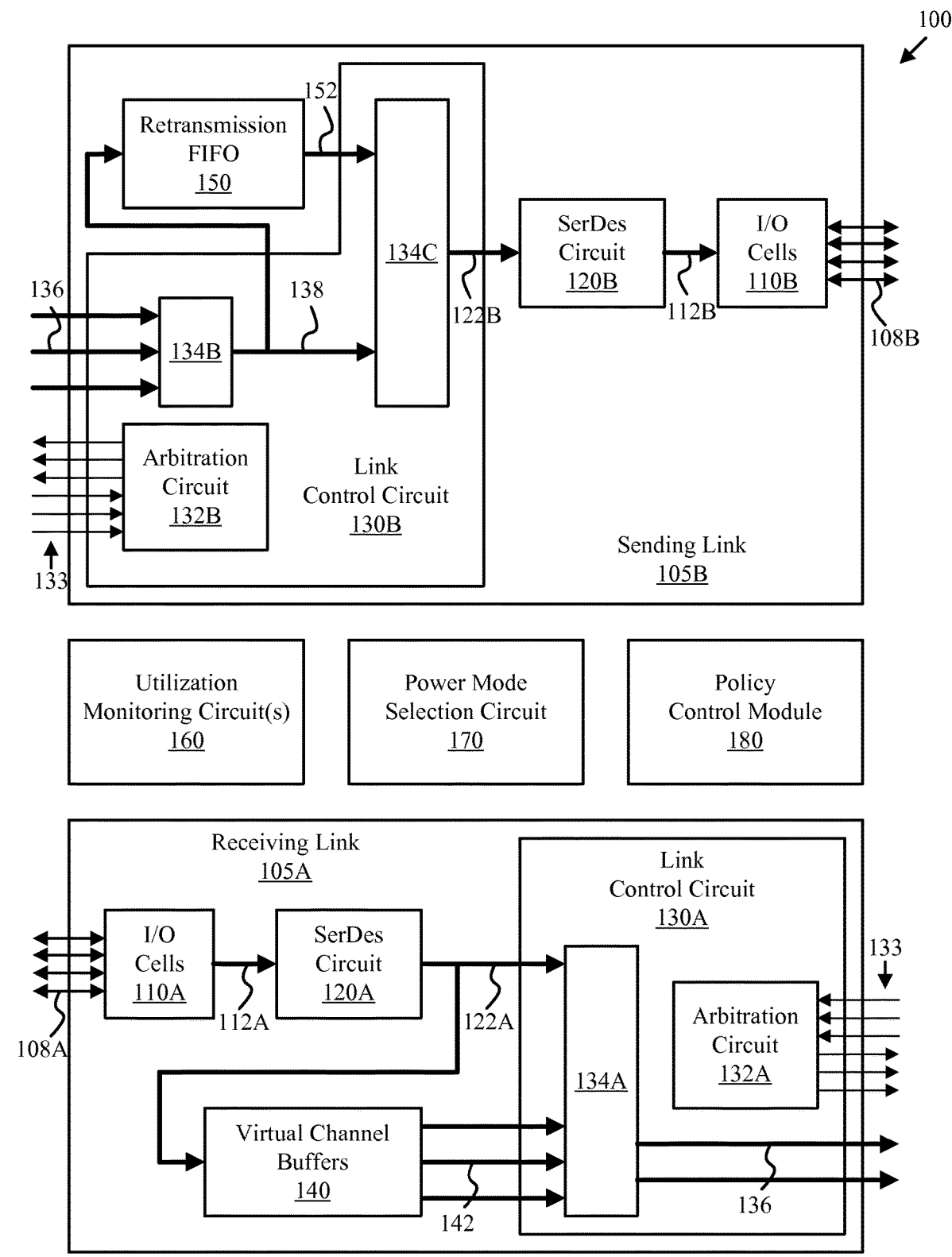
FIG. 1A is a functional block diagram depicting one embodiment of a network interface in accordance with at least one embodiment of the present invention.

Power consumption is a key challenge for every aspect of Exascale computing systems. The embodiments disclosed herein enable reduced power consumption for network links.

As used herein, the phrase 'network interface' refers to an interface for connecting any device (e.g., a network device or node) or host to a network. Examples include network interface cards, switches, routers, and gateways. Such devices may be stand-alone devices or embedded devices.

FIG. 1 is a functional block diagram depicting one embodiment of a network interface 100 in accordance with at least one embodiment of the present invention. As depicted, the network interface 100 includes a receiving link 105A, a sending link 105B, one or more utilization monitoring circuits 160, a power mode selection circuit 170, and a policy control module 180. Although the network interface 100 is shown with a single receiving link 105A and a single sending link 105B, the network interface 100 may include many receiving links 105A and sending links 105B.

The network interface 100 provides power management features to the receiving links 105A and sending links 105B. The receiving links 105A, and the sending links 105B, may operate in a variety of power modes (see, for example, FIGS. 2A-2D) that provide various levels of power consumption. Each power mode may correspond to a particular level of performance and/or set of features for the receiving link 105A and the sending link 105B.

The utilization monitoring circuit 160 monitors a current or projected utilization of as link such as the sending link 105B. For example, a current utilization may be determined by calculating the number of bytes that are sent by the sending link 105B, over a selected time interval. In some embodiments, a projected utilization is determined by calculating a total length of pending packets that are to be sent by the sending link 105B.

The power mode selection circuit 170 may use the current and/or projected utilization to determine a currently preferred power mode for a link such as the sending link 105B. Subsequent to determination, the power mode selection circuit 170 may change the current power mode, for the link, to the currently preferred power mode.

The policy control module 180 may set and act on the currently active power management policy for the network interface 100 in general and a link, such as the sending link 105B, specifically. In some embodiments, the currently preferred power mode is dependent on the power consumption policy as well as the current or projected utilization of the network links 105. The policy control module 180 may be embodied wholly as a hardware circuit or at least partially as a processor that executes program instructions stored within a local memory (not shown).

In some embodiments, the power management policy or the current power management mode (e.g., as set by a system utility or application) requires informing one or more partner network links operating on other devices of the currently preferred power mode. Consequently, an entire network or subnetwork may be configured (e.g., under user software control) to operate in a particular power mode or under a specific power consumption policy. In certain embodiments, partner network links operating on other devices may be informed by transmitting packets with the currently preferred power mode and/or policy encoded within the header of the packet. For example, one or more control bits in a DATA packet header can be used to indicate the currently preferred power mode.

In some embodiments, IDLE packets have the power mode encoded within the packet. IDLE packets are typically short packets with a fixed pattern that a sender sends to its partnered receiver indicating no data is being sent. For example, in some embodiments when a sender 105B decides to switch power mode, it transmits repeated IDLE packets, with the new power mode encoded therein are sent over the sending link 105B. The total number of repeated IDLE packets sent is preferably longer than the largest DATA packet. The partnered receiver 105A on the other side of the network link, after receiving the predetermined number (more than the largest DATA packet) of power mode changing IDLE packets, may adjust its receiving state machine to receive data at the new power mode setting. The data pattern used for IDLE packets is preferably recognizable by the partnered receiver 105A in multiple power modes. In some embodiments, IDLE packets are sent previous to packet retransmissions in order to ensure that the currently preferred power mode is the same on the sending link 105B and the partnered receiving link 105A.

Figure 1B:
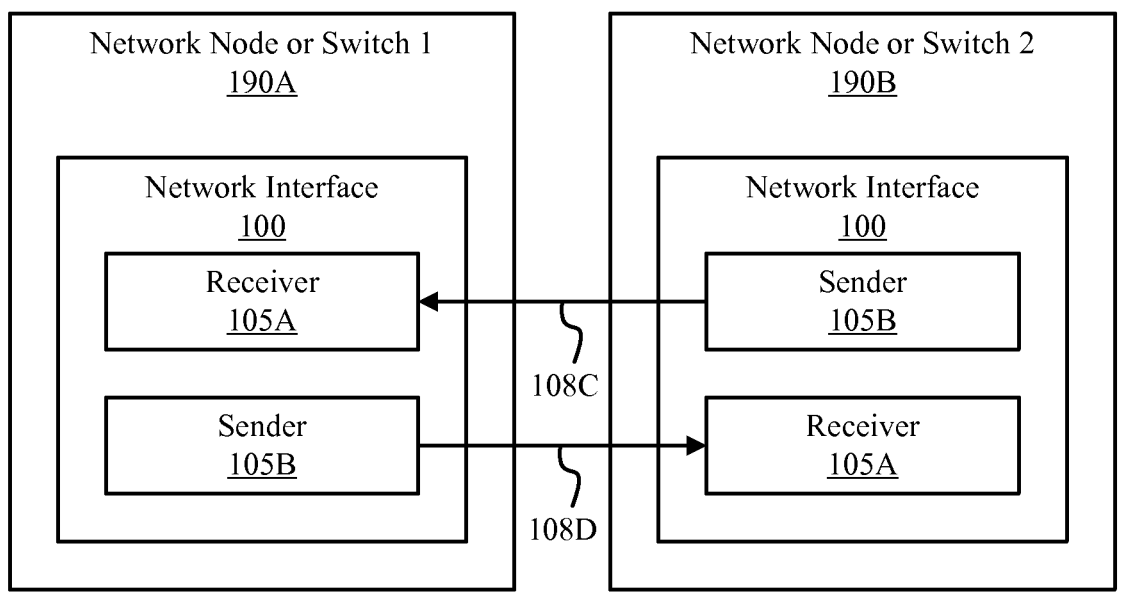
FIG. 1B is a functional block diagram depicting interaction between two nodes or switches that incorporate the network interface of FIG. 1A.
Figure 2A:
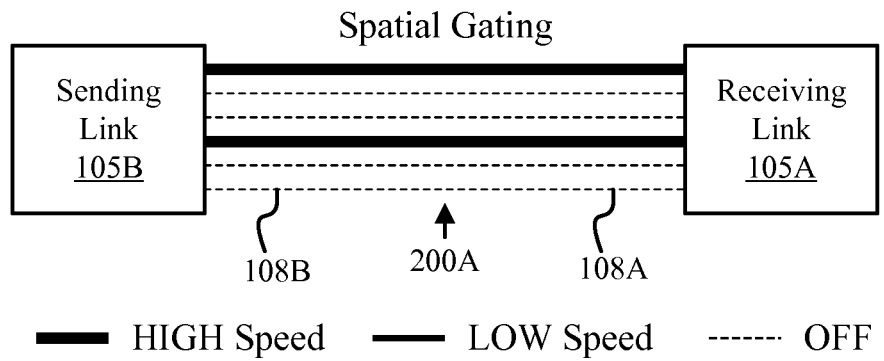
FIGS. 2A, 2B, 2C, and 2D are timing diagrams depicting various examples of power modes in accordance with at least one embodiment of the present invention.
Figure 2B:
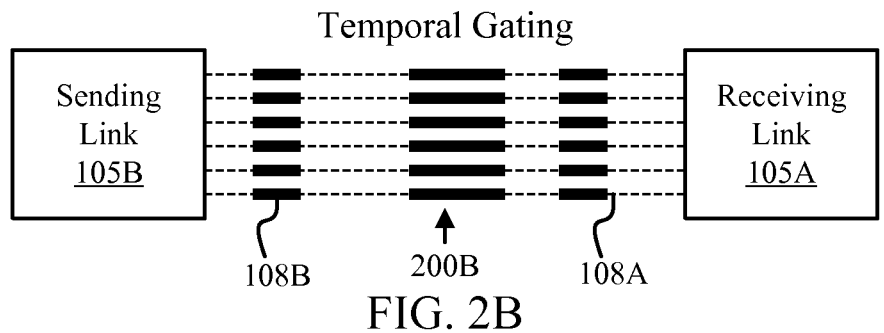
Figure 2C:
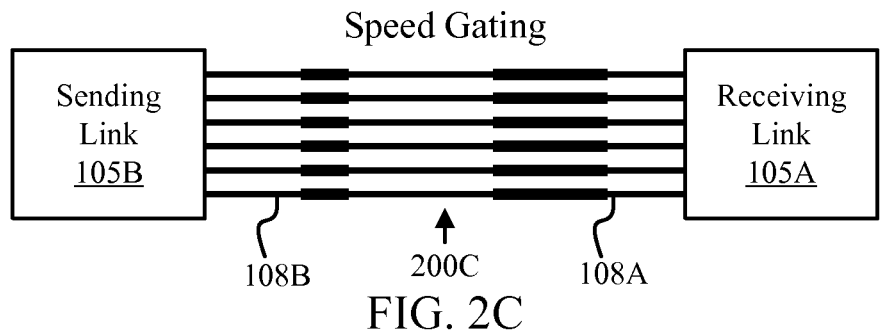
Figure 2D:
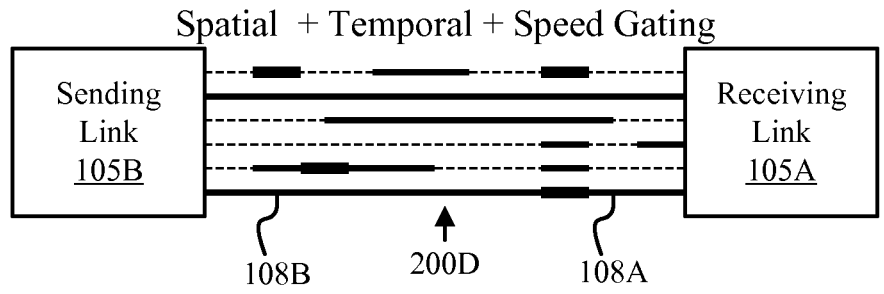

Using power switching IDLE packets enables a sender 105B on network node or switch 1 to effectively control the power mode of the link from itself to its partnered receiver 105a on network node or switch 2 at the other end of the network link, see FIG. 1B. The control can be done in hardware completely. The time to switch power mode is very short, only slightly longer than the transmission time of the largest DATA packet. The network link is fully functional in different power mode without any long data transmission gaps introduced by power switching.

The reverse link from sender 105B on network node or switch 2 to receiver 105A on network node or switch 1 is independently controlled by the sender 105B on network node or switch 2. The two links in the opposite direction of transmission have no correlation (other than global software settings) in terms of their policy of setting their link power modes.

One of skill in the art will appreciate that the utilization monitoring circuit 160, the power mode selection circuit 170, and the policy control module 180 may be configured to operate with a wide range of embodiments for the receiving links 105A and sending links 105B. However, for the purpose of brevity and clarity, operation of the network interface 100 will primarily be described herein using the depicted receiving link 105A and sending link 105B.

The depicted receiving link 105A includes a set of I/O cells 110A, a serdes circuit 120A, a link control circuit 130A, and a set of virtual channel buffers 140. The depicted link control circuit 130A includes an arbitration circuit 132A and a multiplexor or switch 134A.

The I/O cells 110A receive data provided by a set of interconnections 108A that electrically or optically couple the receiving link 105A to a corresponding sending link which is typically located on another device. Sending and receiving links that are coupled by the interconnections 108 (i.e., 108A or 108B) are referred to herein as partner links. In some embodiments, a receiving link 105A and a sending link 105B collectively provide a single bidirectional link by sharing a common set of interconnections 108.

The set of interconnections 108A may provide a corresponding set of signals (not shown) that are decoded by the I/O cells 110A to provide serial data 112A. The set of signals as received by the interconnections 108A may be asynchronous from each other and then aligned by the I/O cells 110A and interleaved, or otherwise arranged, to provide serial data 112A. The serdes circuit 120A may convert the serial data 112A from a serial format to a parallel format and thereby provide parallel data 122A.

The parallel data 122A may be received by the multiplexor or switch 134A directly, or routed through a set of virtual channel buffers 140, to provide a set of data channels 142. The virtual channel buffers 140 may hold the data 122A until it is needed by the sending link 105B or by some other data sink such as a local receiving party. The arbitration circuit 132A may arbitrate forward progress of packets either already received in the virtual channel buffers or being received on link 108A and appeared on 122A in the receiving link 105A. The multiplexor or switch 134A may select the data 122A or one of the data channels 142 for transmission to a data sink (such as a sender or a local reception FIFO, not shown) via an internal channel 136.

The depicted sending link 105B includes a set of I/O cells 110B, a serdes circuit 120B, a link control circuit 130B, and a retransmission FIFO 150. The depicted link control circuit 130B includes an arbitration circuit 132B and a pair of multiplexors 134B and 134C.

The arbitration circuit 132B may arbitrate access to the sending link 105B. For example, a plurality of transmitting parties (e.g., receivers and injection FIFOs) may request use of the sending link 105B. In some embodiments, each transmitting party indicates a packet length in conjunction with the arbitration process and a total length of pending packets is maintained by the arbitration circuit 132B (and optionally the arbitration circuit 132A). The arbitration circuit 132B may grant access to internal channel 136 to a selected transmitting party via arbitration signals 133. The internal channel 136 may be connected to an internal switching array (see, for example, FIG. 3C).

The multiplexor 134B may select one of the internal channels 136 as a selected channel 138. The data of the selected channel 138 may be provided to the multiplexor 134C and the retransmission FIFO 150. The retransmission FIFO 150 captures data corresponding to packets transferred by the selected channel 138 and hold the data until delivery of the packets is verified. If delivery of a packet is not verified, the retransmission FIFO 150 may provide data corresponding to a packet as retransmission data 152. The multiplexor 134C may select the retransmission data 152 or the data of the selected channel 138 and provide the data as parallel data 122B.

The serdes circuit 120B may convert parallel data 122B to a serial format and thereby provide serial data 112B which is presented to the I/O cells 110B. The I/O cells 110B may transmit a set of signals (not shown) on a set of interconnections 108B that electrically or optically couple the sending link 105B to a corresponding partner link. The partner link is typically located on another device.

It should be noted that the links 105A and 105B may be part of any network topology including but not limited to a multi-dimensional torus, CLOS type fat tree networks, multi-level all-to-all inter-connection networks, and the like. Furthermore, the network interface 100 may include one or more injection FIFOs (not shown) and extraction FIFOs (not shown) that enable data to be locally injected into, and extracted from, a network formed by various interconnected links 105A and 105B. For example, the injection FIFOs and extraction FIFOs may be connected to the internal channels 136 and enable injection into, and extraction from, a network topology formed by interconnected links 105 from various devices (nodes) within the network topology.

FIG. 1B is a functional block diagram depicting interaction between two nodes (or switches) 190 that incorporate the network interface 100 of FIG. 1A. As depicted, a first node 190A may be interconnected to a second node 190B via either cables or board traces depicted by 108C and 108D. The sender 105B on network node or switch 190A is connected to the receiver 105A on the partnered node or switch 190B, and vice versa. In some embodiments of the network interface 100, the power mode selection circuit 170 and the policy control module 180 (not shown in FIG. 1B)

are connected to the senders 105B but not the receivers 105A. In these embodiments, each receiver 105A may autosync with the sender 105B to which it is remotely paired. For example, IDLE packets that have the currently preferred power mode and/or power consumption policy encoded within the packet may be used to place each receiver 105A into the expected power mode to the sender 105B to which it is paired. Consequently, in the depicted arrangement the power mode used to transmit to, and receive data from, the interconnections 108C and 108D may be different from each other.

FIGS. 2A, 2B, 2C, and 2D are functional block diagrams depicting various examples of power modes in accordance with at least one embodiment of the present invention. As is shown, the receiving link 105A (or the like), and the sending link 105B (or the like), may operate in a variety of power modes that provide various levels of power consumption. Each power mode may correspond to a particular level of performance and/or set of features for the receiving link 105A and the sending link 105B.

For example, a spatially gated mode 200A is just one example of selectively activating specific interconnections 108 in order to provide a specific bandwidth capability and power consumption level for the links 105. In contrast, a temporally gated mode 200B is one specific example of selectively activating the interconnections 108, as a group, over time. Furthermore, a speed gated mode 200C is one example of varying the operating speed of the interconnections collectively over time. Finally, a multi-factor gated mode 200D is one example of spatially and temporally activating individual interconnections as well as varying the operating speed of the interconnections.

Advancements in physical I/O cell technology promise fast recovery times (below 100 ns) from a power gated (i.e., low power) mode to a high power mode. The current disclosure illustrates methods of utilizing this new I/O cell feature and incorporating fast power mode switching directly into network hardware and bypassing, in some embodiments, any software control in changing power modes. This enables each network link to run at optimal power settings without degrading network performance.

One of skill in the art will appreciate that the bandwidth of the interconnections 108 may be varied to match the bandwidth demand imposed on the links 105. Consequently, the power mode of the links 105 may also be varied in order to reduce power consumption on 108 while adjusting to changes in the bandwidth demand imposed on the links 105.

Figure 3A:
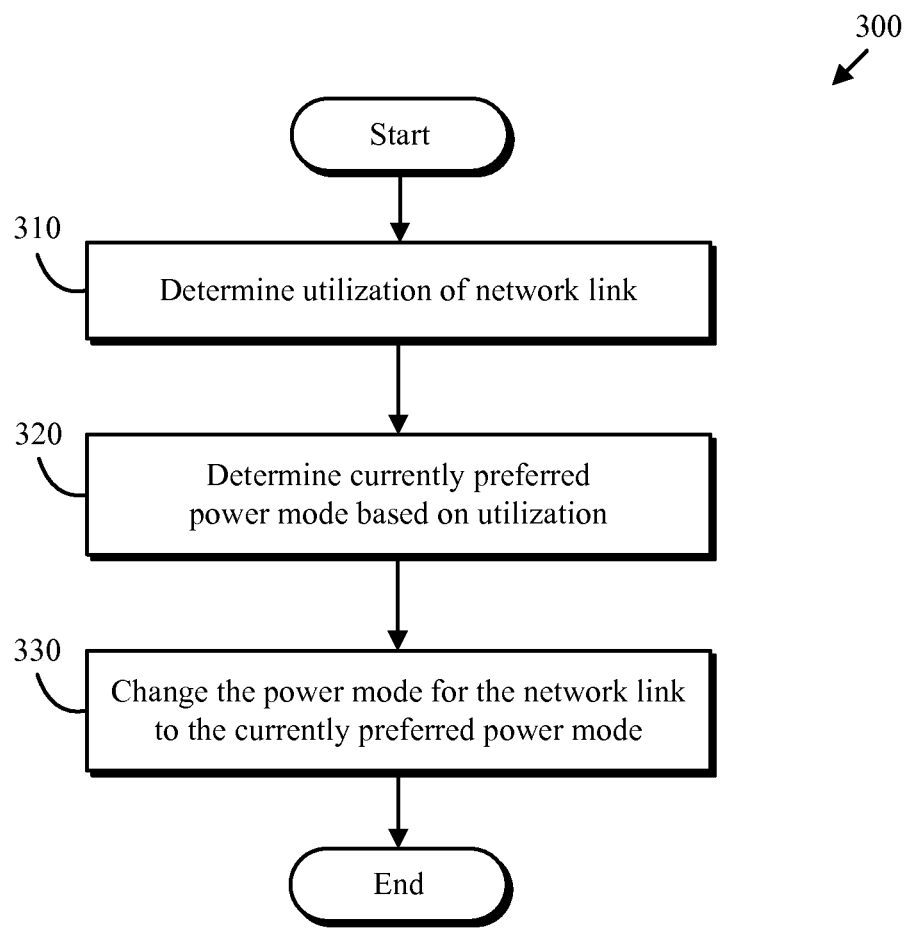
FIG. 3A is a flowchart depicting a first embodiment of a power mode adjustment method in accordance with the present invention.

FIG. 3 is a flowchart depicting a power mode adjustment method 300 in accordance with the present invention. As depicted, the power mode adjustment method 300 includes determining (310) utilization of a network link (e.g., a sending link), determining (320) a currently preferred power mode, and changing (330) the power mode for the network link. The power mode adjustment method 300 may be conducted by the network interface 100 or the like.

Determining (310) utilization of a network link may include determining a current or projected utilization of a particular network link. For example, a current utilization may be determined by calculating the number of bytes that are sent or received by the network link over a selected interval of time (e.g., over the last mille-second) or determining how full the retransmission FIFO 150 is. In some embodiments, a projected utilization is determined by calculating a total length of pending packets that are to be sent by the sending link 105B.

Determining (320) a currently preferred power mode may include mapping the current or projected utilization to the currently preferred power mode. For example, a range of utilization values may correspond to a power mode that is preferred for that utilization range.

Changing (330) the power mode for the network link may include activating one or more forms of power gating such as spatial gating, temporal gating, and speed gating. For example, when a sender 105B decides to switch to a different power mode, it may send power mode changing IDLE packets over its outgoing link. The total number of IDLE packets is preferably longer than the largest DATA packet plus the time for the partner receiver 105B to adjust its I/O cells to switch to a different power mode. This time is usually instantaneous when switching from a high power state to a low power state, but may be longer when switching from a low power state to a high power one. Pending advancements in I/O cell technology have potentially reduced this switching time to less than 100 ns. The partner receiver 105B, upon detecting power changing IDLE packets longer than the largest DATA packet, will stop processing incoming parallel data 122A temporarily and program its I/O cells 110A and serdes circuit 120A to change to the new power mode. Once the switching is confirmed, the receiver will start processing the incoming parallel data 122A again. The original sender 105B, after sending enough power changing IDLE packets, can start sending DATA packets in the current power mode without getting confirmation of successful power mode switching from the partner receiver 105A.

Figure 3B:
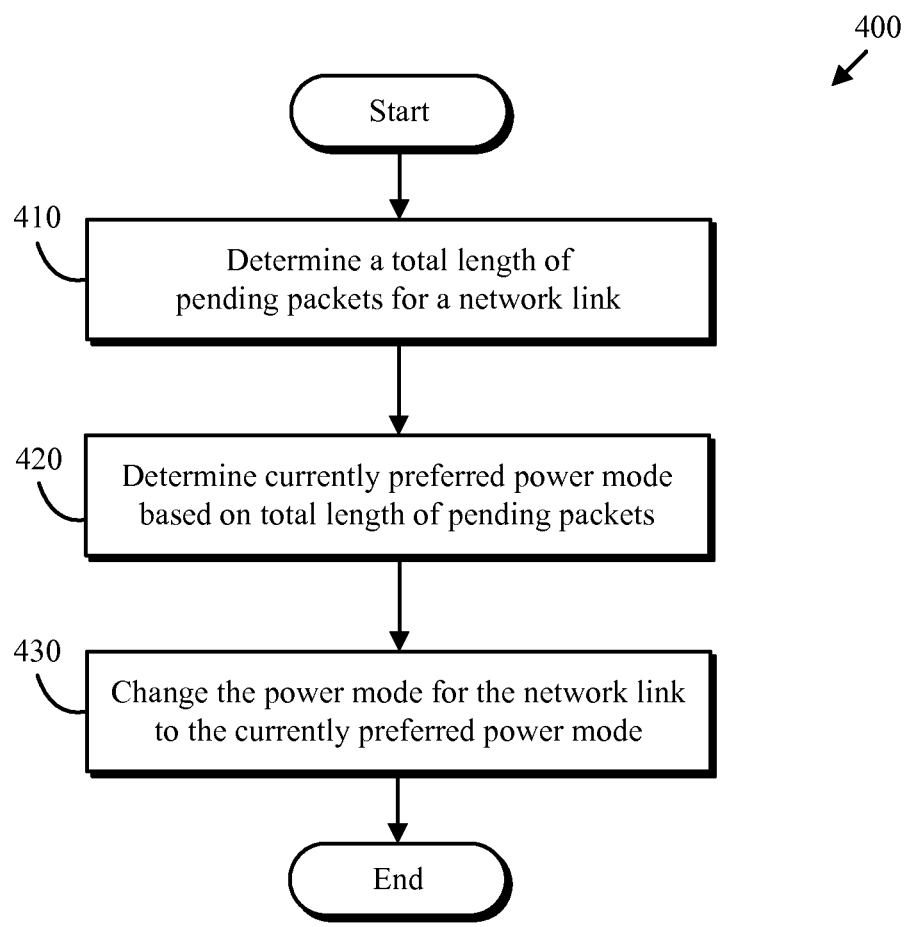
FIG. 3B is a flowchart depicting a second embodiment of a power mode adjustment method in accordance with the present invention.

FIG. 3B is a flowchart depicting a power mode adjustment method 400 in accordance with the present invention. As depicted, the power mode adjustment method 400 includes determining (410) a total length of pending packets for a network link, determining (420) a currently preferred power mode, and changing (430) the power mode for the network link. The power mode adjustment method 400 may be conducted by the network interface 100 or the like.

Determining (410) a total length of pending packets for a network link may include maintaining a count of the total length of pending packets for a network link. For example, as a packet is transmitted or received, the length of the packet may be subtracted from the total length of pending packets. When access to a network link is requested, an expected packet length may be indicated by the requesting party and added to the total length of pending packets.

Determining (420) a currently preferred power mode may include mapping the total length of pending packets to the currently preferred power mode. For example, specific ranges of utilization values may correspond to a power mode that is preferred for that utilization range.

Similar to operation 330, changing (430) the power mode for the network link may include activating one or more forms of power gating such as spatial gating, temporal gating, and speed gating and may be changed by electronic circuitry (e.g., the power mode selection circuit).

Figure 3C:
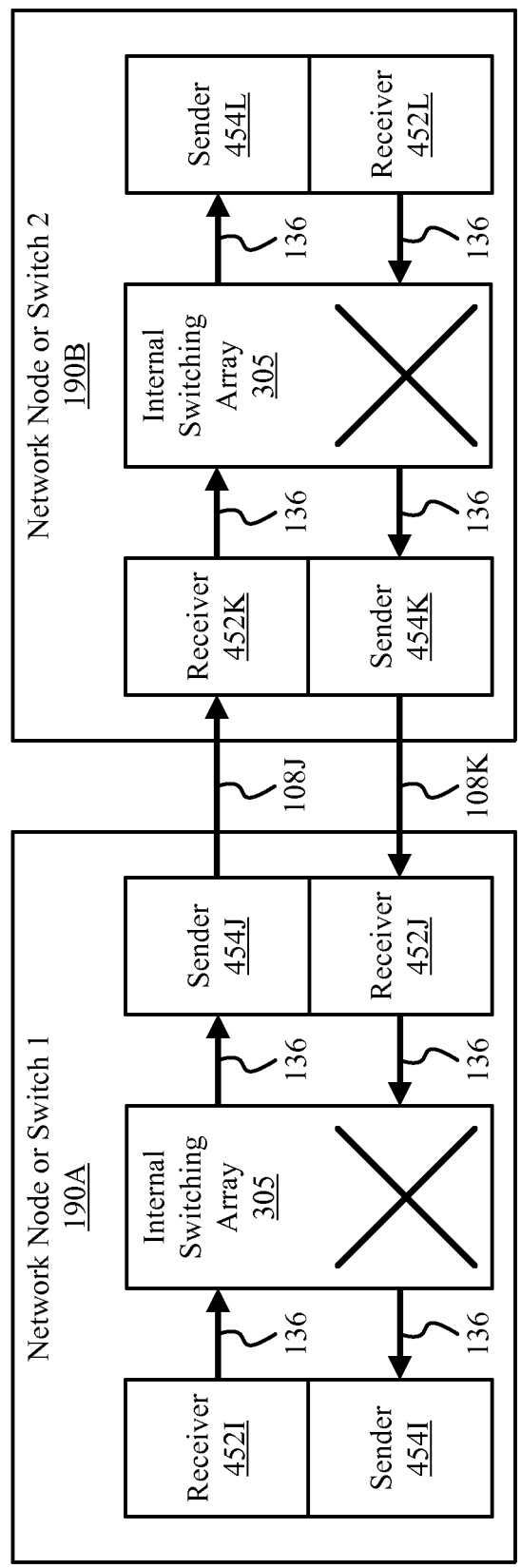
FIG. 3C is a functional block diagram depicting one embodiment of a cut-through configuration for the network interface of FIG. 1.

In some embodiments, the receivers 105A and senders 105B for different ports on the same network node or switch 190 may operate in a cut-through configuration. For example, FIG. 3C is a functional block diagram depicting one embodiment of sub-network 450 that is able to leverage such a cut-through configuration. The sub-network 450 includes a first node or switch 190A that is connected to a second node or switch 190B. The nodes 190 comprise one or more receivers 452 (e.g., receivers 105A) and one or more senders 454 (e.g., senders 105B).

The nodes 190 may operate in a cut-through configuration that bypasses the internal buffering of data packets and thereby reduces network latency. For example, a receiver 4521 on one port may start arbitrating for a sender 454J on a different port when the receiver 4521 just received the packet header. If the arbitration request is granted, packet data can flow directly over an internal data switch 305 (e.g., a cross-bar switch) to the sender 452J. In turn, the sender 454J may indicate a power mode change to the receiver 452K for the data transmitted on connection(s) 108J. In some embodiments, the node 190B responds by indicating a power mode change to the receiver 452J for the data transmitted on connection(s) 108K. In other embodiments, a sender 454 and receiver 452 associated with the same port always operate in the same power mode.

If the receiver and the sender on a node 190 that are associated with different ports are operating in the same power mode, then data can flow through the node 190 without the need for internal buffering and network latency is reduced. When the receiver and sender are operating in different power modes, cut through traffic may still be enabled to minimize network latency. For example, if the receiver is running in a lower power mode (slower speed) than the sender, the sender may inform its partner receiver on a different network node/switch by marking a few bits in the data packet header to indicate that this packet is a lower power mode packet than the current operating power mode over the outgoing port. The sender may then forward the data it received from the internal bus 136 to its serdes and I/O cell, keeping a copy in its retransmission FIFO. Because the sender is operating at a faster speed, it will see repeated data patterns in its internal data bus 138. The sender's control logic and retransmission FIFO can take this into account in terms of counting and storing this packet. On the other side of the link, the partner receiver, while also operating in faster speed, when it sees the packet header marked for a lower speed, it can adjust its internal logic to only store and forward data at a slower rate corresponding to the speed mismatch. For example, if on the origin node, the initial receiver is operating at ¼ of the speed of the outgoing sender, then the partnered receiver will see each data element repeated 4 times on its internal bus 122A. It will only forward or store data every $4^{th}$ beat, ignoring the other 3 beats of data. Once the low power cut-through packet is over, the sender on the origin node and its partnered receiver can go back to high speed data transfers immediately. Second, if the origin receiver is operating at higher power mode or faster speed than the outgoing sender, the outgoing sender will still receive data at the faster rate from the internal data cross-bar over mux 134B to 138, it will then buffer the incoming faster speed data in its retransmission FIFO 150 and sends data out at a slower speed. Its partnered receiver only sees the lower power mode, slow speed data. Cut-through is also enabled in the origin node sender's retransmission FIFO, i.e., when the first data element is written into the retransmission FIFO, the sender will start to send the data packet out at a slower rate. This method minimizes the network latency. In essence, the network internal cross-bar and associate control logic in all receivers, senders, injection FIFOs and reception FIFOs, are all operating in high speed mode regardless of the power mode each data link port is operating in.

In some embodiments, the internal channels 136 can support lower speed data transfer rates. For example, when operating in the cut-through configuration 450, or the like, data transfers via the internal channels 136 may occur at a selected reduced rate (e.g., ½ or ¼ speed) and provide valid data on the internal channels 136 on selected cycles (e.g., every 2 or 4 cycles). In certain embodiments, the internal channels 136 connect to (e.g., are carried over) a cross-bar switch (not shown).

In addition to improved power consumption, the disclosed embodiments may improve data throughput and/or network latency. For example, when an arbiter for a sending link receives requests from one or more injection FIFOs or receivers, the arbiter may pick one of the requesters, send back a grant signal, and set the input data bus mux selector to that requester. The granted requester then sends data via the sending link 105B. In some embodiments, the link control circuit 130B appends a link level packet sequence number to the packet header, sends the packet onto the interconnections 108 via the SerDes circuit 120B and the I/O cells 108B. The link control circuit 130B may also put the packet being sent into the retransmission FIFO 150. While the packet is being sent, a packet CRC may be accumulated by the link control circuit 130B or the SerDes circuit 120B and appended to the end of the packet along with certain trailer bits.

When the receiving link 105A at the other end of the interconnections 108B (e.g., the interconnections 108A of a different node) receives the packet, it may verify the packet CRC, and if it is good, update an internally stored acknowledgement sequence number with the latest successfully received packet sequence number. When the reverse link is ready (i.e., not busy sending packets) an ACK packet may be sent back with the acknowledgement sequence number.

The receiver on the first node may forward the acknowledged sequence number to a paired sender of the same link on the same node. The sender then deletes packets in the retransmission FIFO that has sequence numbers less than or equal to the acknowledged sequence number.

In case of a link error that corrupts a packet from a first node to a second node, the receiver on the 2nd node will detect that the packet CRC is bad, and not send an ACK message for that packet. The sender on the 1st node will eventually timeout and retransmit the packet whose sequence number is not acknowledged and all packets after that packet. The retransmission packets may be proceeded with a number of IDLE packets so that the receiver on the 2nd node can recover from the error state caused by the link error. In one embodiment, IDLE packets are longer than the largest DATA packet size plus the time needed for the partner receiver to adjust power mode are sent to avoid an accidental DATA packet whose data payload happens to match the exact IDLE pattern.

In certain embodiments, the link control circuits 130A and 130B are aware of the current power mode. In some embodiments, a user application or operating system can select a policy where a programmable selection of the currently preferred power mode is limited to a certain duration of time. In certain embodiments, this is accomplished by programming some control registers in the SerDes circuits 120A and 120B.

Figure 4A:
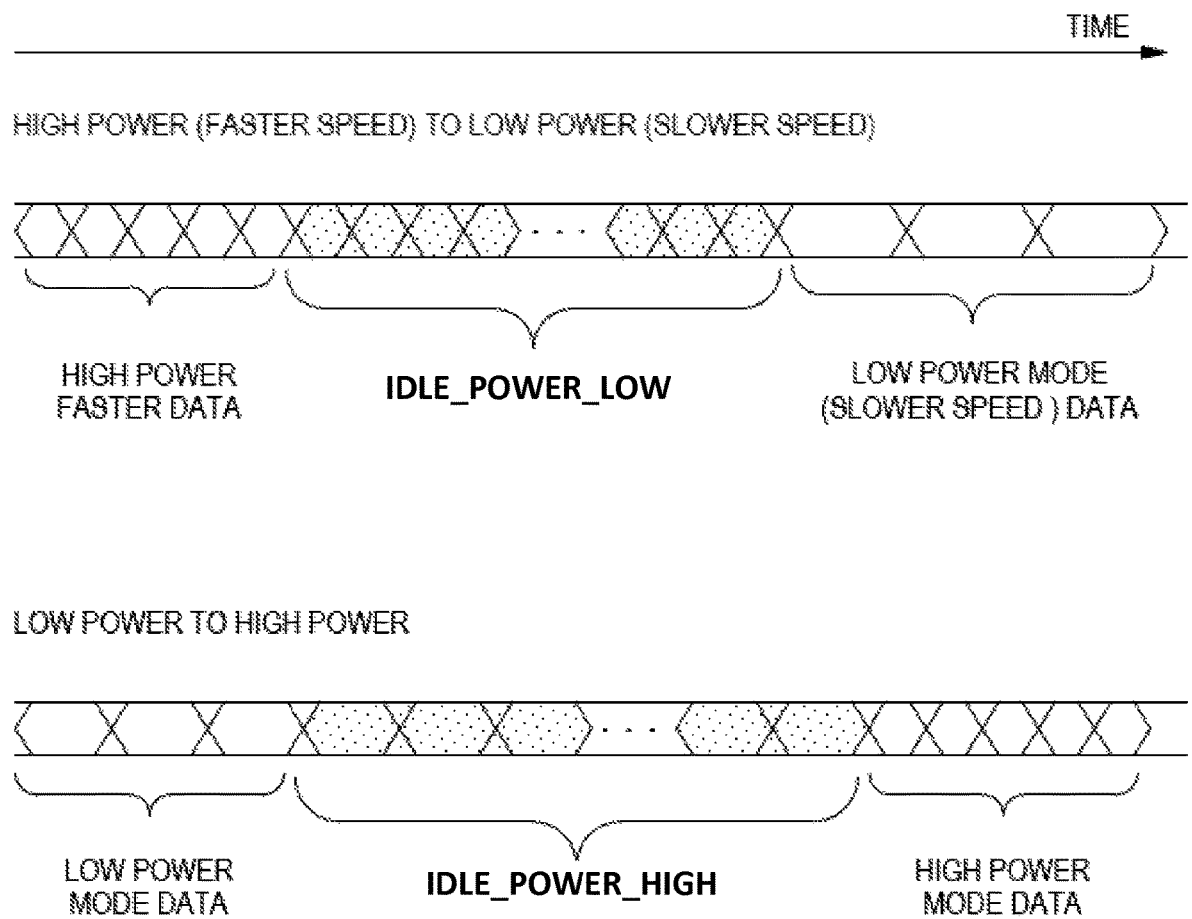
FIG. 4A is a timing diagram and FIGS. 4B-4F are schematic block diagrams depicting additional details of specific embodiments of the present invention.

FIG. 4A is a timing diagram and FIGS. 4B-4F are schematic block diagrams depicting additional details of specific embodiments of the present invention.

As shown in FIG. 4A, IDLE_POWER_LOW (change to low power mode) idle packets may be sent at faster data rate that corresponds to a high power mode. In contrast, IDLE_POWER_HIGH (change to high power mode) idle packets may be sent at a slower data rate that corresponds to a low power. The data pattern of the IDLE_POWER_LOW and IDLE_POWER_HIGH packets may be selected so that the idle packets are detectable at both data rates. Consequently, the link control circuit 130A may be configured to recognize both IDLE packets in either power mode.

Figure 4B:
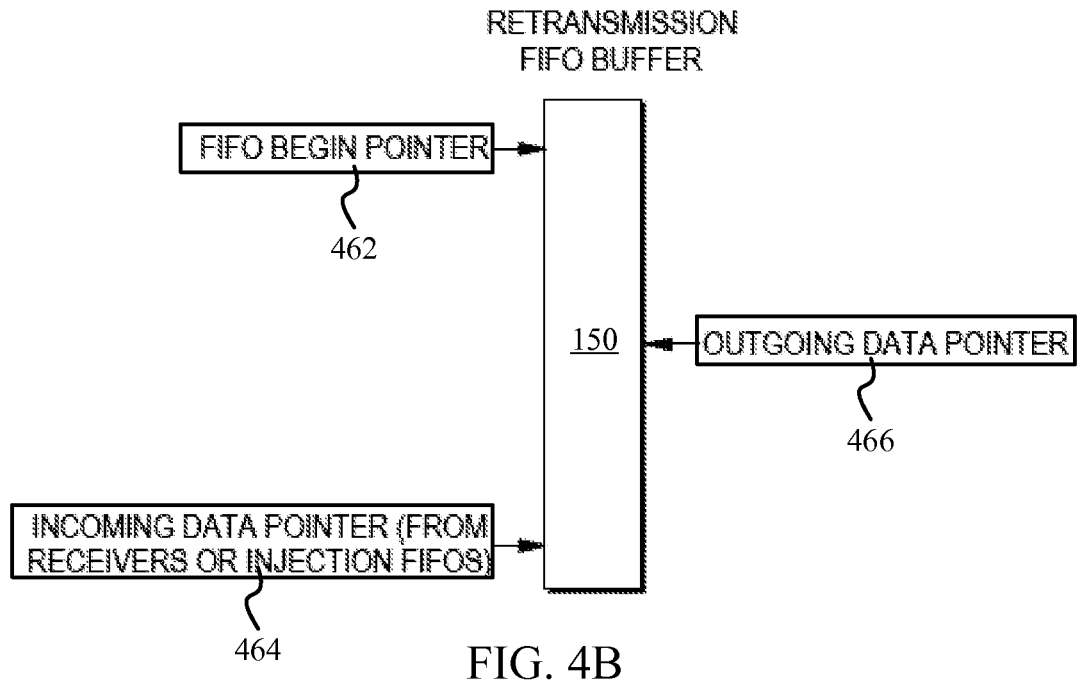

As shown in FIG. 4B, to use a retransmission FIFO 150 also as an output buffer, three FIFO data pointers may be used. A FIFO BEGIN pointer 462 may indicated where valid, unacknowledged data starts. An INCOMING DATA pointer 464 may indicate where the data for new data packets is inserted (and possibly being transmitted at the same time, depending on the state of retransmission). An OUTGOING DATA pointer 466 may be used for retransmission, or when there is a mismatch between the incoming and outgoing data rates. The internal network switches or multiplexors (e.g., multiplexors 134B and 134C) and the incoming data (e.g., carried on an internal channel 136 and) provided to a sending link 105B may run at a faster data rate than the operating speed of the sending link 105B. For example, the sending link 105B may be operating in a low power mode that transmits at a lower data rate. Consequently, the retransmission FIFO 150 may use the depicted pointers to manage data rate mismatches between the internal channels 136 and the links 105.

Figure 4C:
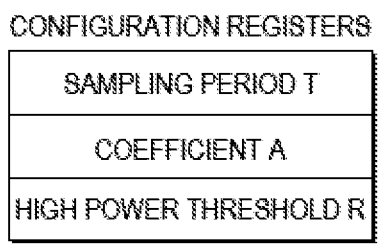
Figure 4C:
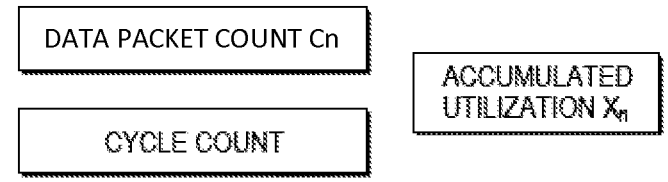

In some embodiments, a number of counters and programmable threshold control registers are provided by the link control circuits 130B. These counters may be used to track utilization and set the current power mode. For example, as shown in FIG. 4C as well as FIG. 1, each link 105 may be equipped with a link utilization monitoring circuit 160. The link utilization monitoring circuit 160 may include various configuration registers 470. In the embodiment depicted in FIG. 4C, the configurations registers include a sampling period register T, an aging coefficient register A, and a threshold register R. In addition the link utilization monitoring circuit 160 may include a number of counters such as a data packet counter (it can count either number of packets, number of flits, or bytes) and a cycle counter. The data packet counter and the cycle counter may be reset every sampling period T. When cycle counter is equal to T, the current value of the data packet counter may be recorded as Cn. The value Cn may be accumulated into a running utilization Xn using the formula:

$$Xn = (1-A) \cdot Cn + A * Xn-1 \quad (1)$$

where Xn−1 is the previously accumulated count, and A<0.5. Subsequently, Xn may be compared with threshold R. If Xn is greater than R, a signal (not shown) may raised to the final policy decision logic (e.g., policy control module 180). The signal may indicate that based on utilization, a high power mode is preferred.

Figure 4D:
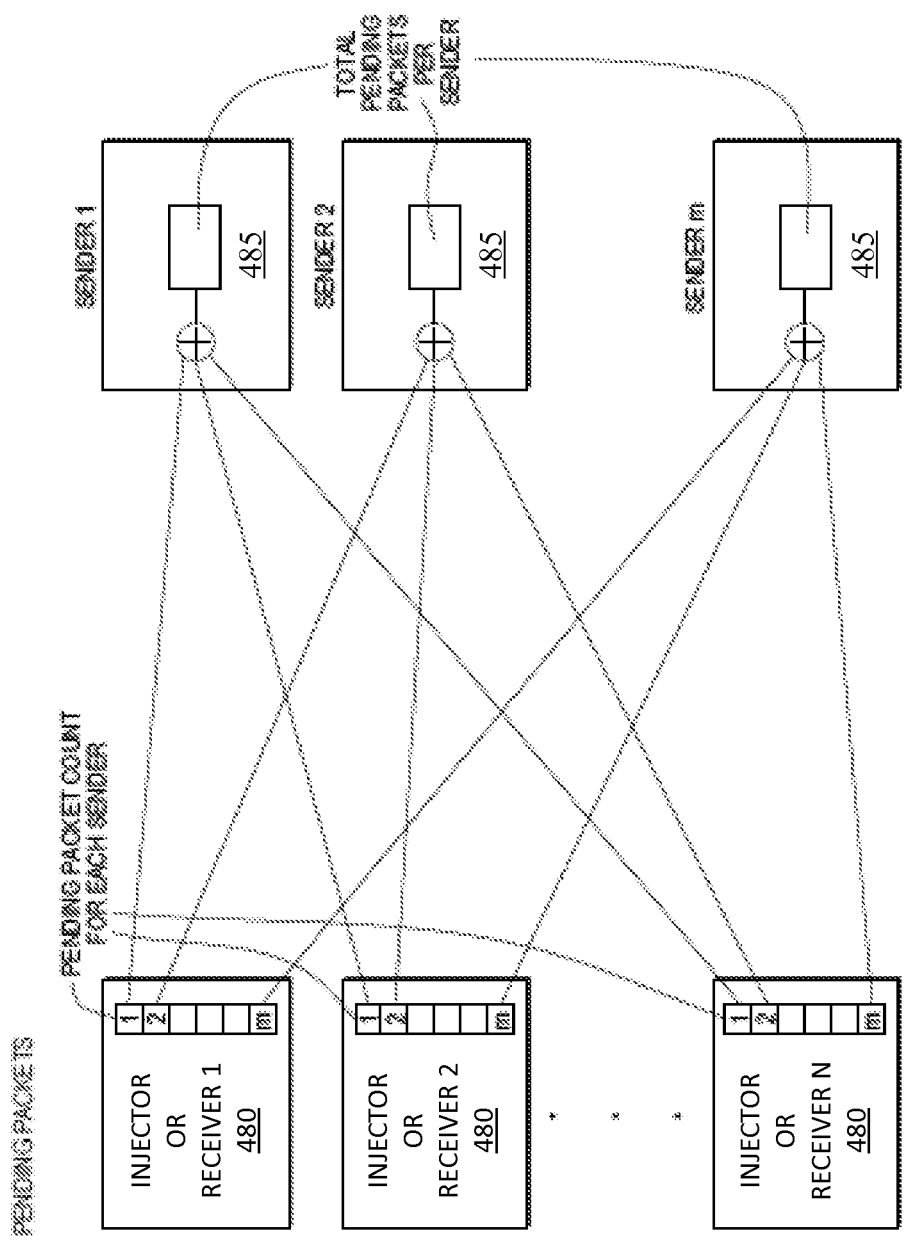

As shown in FIG. 4D, each injection FIFO or receiver 480 (e.g. receiving link 105A) may keep a pending packet count for each sending link 105B. When a packet is injected from the local processor or received by a receiver, the routing logic may determine which sending link 105B should be used for transmission of a packet. In response thereto, the packet count for the output link is incremented. In one embodiment, each sender sums up the pending packet counts from all injection FIFOs and all other receivers (not including the receiver paired to the sender itself). The calculated sum (e.g., a total length of pending packets) may be compared with a preprogrammed threshold in a configuration register. The result of the comparison may indicate a selected level of future utilization and may be sent to the final policy decision circuit (e.g., within policy control module 180) in the sender.

When a packet in an injection FIFO or receiver wins arbitration and starts moving to an output link (sender), the corresponding pending packet count for the output link is decreased. For deterministic packets where a fixed network path is taken, a packet is routed to a single output link and only one count for the sender is involved. But for adaptively routed packets, there are multiple output link choices. When such a packet comes into an injection FIFO or a receiver, all possible output counts are increased; and when this packet moved, all related output port packet counts are decreased, even though only one sender out of several possible senders is selected to forward the packet.

Figure 4E:
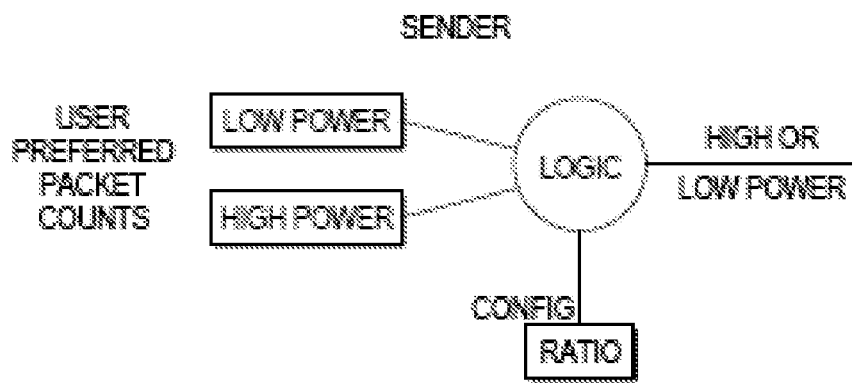

As shown in FIG. 4E, in one embodiment each sender includes two running counters (reset every period T, similar to FIG. 4C). One counter is used to track low power mode preferred packets and the other is used to track high power mode preferred packets. The preferred power mode may be set in a DATA packet header by a user program. A logic control circuit may determine the approximate ratio of the 2 counters and compare the ratio with a pre-programmed configuration register (threshold). The result of the comparison may be sent to final decision logic.

For small packets that are latency critical, a user can also set the preferred power mode to be non-switching, i.e., maintain the power mode of the link. This enables latency critical packets to route through the network without incurring the overhead of power mode changing IDLE packets, which is at least as long as a largest DATA packet.

Figure 4F:
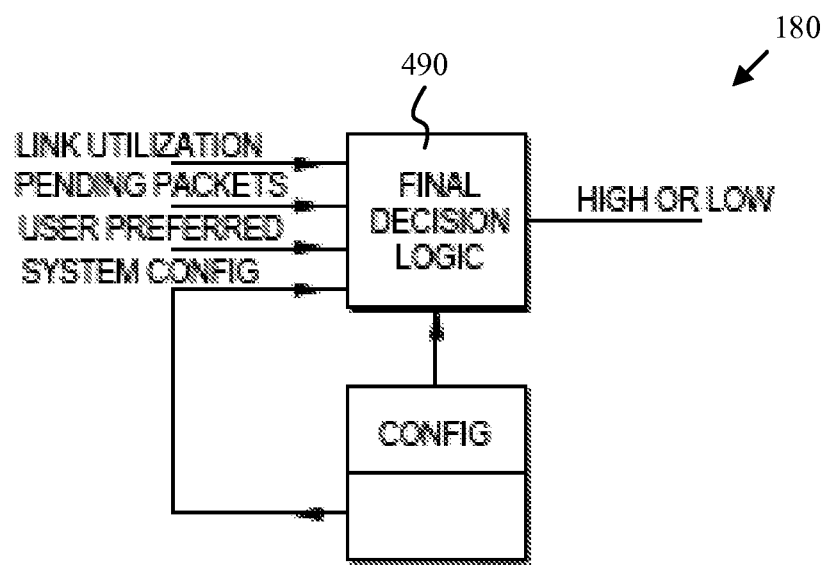

As shown in FIG. 4F, a final decision logic circuit 490 (e.g., within policy control module 180) may take into account link utilization, pending packets, user preferred power mode packet ratio, and system configuration settings to decide whether to switch power mode. While a simplistic policy might switch to a high power mode when any receiving link receives a request from a partner link to transition to a high power mode, more complicated policies may be responsive to utilization rates, software initiated requests (e.g., an application or system utility), configuration settings, and other factors.

Figure 5:
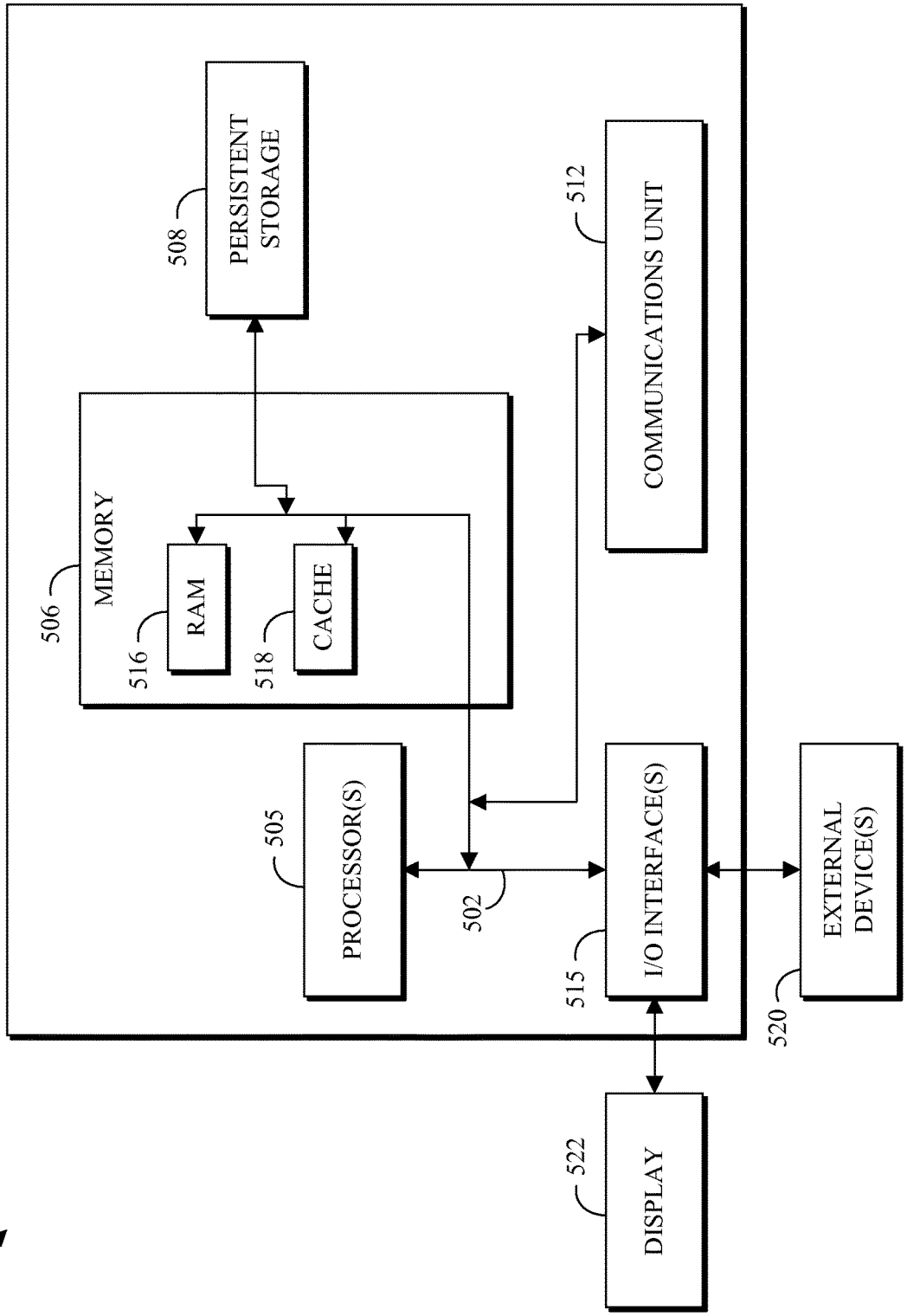
FIG. 5 is a block diagram depicting one example of a computing apparatus (i.e., computer) suitable for executing at least some of the methods disclosed herein.

FIG. 5 is a block diagram depicting components of a computer 500 suitable for executing at least some of the embodiments of the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosed embodiments improve power consumption for network links. It should be noted that the apparatuses (e.g., circuits and modules) disclosed herein may be integrated with additional circuitry within integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein. It should also be noted that, as used herein, the term "or" refers to every logical combination of two options. For example, the phrase "A or B" is essentially identical to the phrase "(A and not B) or (B and not A) or (A and B)".

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for use with a network link that supports a plurality of data transmitting power modes, the method comprising:
   determining, with a utilization monitoring circuit, a utilization value for the network link;
   determining, with a power mode selection circuit, that the utilization value has fallen below a predetermined threshold;
   responsive to the determination that the utilization value has fallen below the predetermined threshold, activating, with the power mode selection circuit, a power gated mode in the network link so that the power gated mode transmits data packets, that are not idle packets, at a reduced rate by power gating the network link;
   subsequent to the activation of the power gated mode, transmitting through the network link and by the policy control module, data packets, that are not idle packets, at a reduced rate determined by the power gating of the network link;
   subsequent to the transmission of the data packets, processing, by a first receiver, the data packets, that are not idle packets, that are being transmitted at the reduced rate determined by the power gating of the network link; and
   responsive to the processing of the data packets that are not idle packets that are being transmitted at the reduced rate, configuring, by the policy control module, a communication network for the network link to operate at the reduced rate determined by the power gating of the network link, with the network link being operated at the reduced rate determined by the power gating of the network link to reduce the overall power consumption of an exascale computing system on which the network link operates.

2. The method of claim 1 further comprising:
   determining, with the power mode selection circuit, that the utilization value has exceeded the predetermined threshold;
   responsive to the determination that the utilization value has exceeded the predetermined threshold, activating, with the power mode selection circuit, the power gated mode in the network link so that the power gated mode transmits data packets, that are not idle packets, at an increased rate by power gating the network link; and
   subsequent to the activation of the power gated mode, transmitting through the network link, data packets, that are not idle packets, at an increased rate determined by the power gating of the network link.

3. The method of claim 1 wherein the power gating includes speed gating.

4. The method of claim 1 wherein the power gating includes temporal gating.

5. A computer program product (CPP) for use with a network link that supports a plurality of data transmitting power modes, the CPP comprising:
- a computer readable storage medium; and
- computer code stored on the computer readable storage medium, with the computer code including data and instructions for causing a processor(s) set to perform at least the following operations:
  - determining, with a utilization monitoring circuit, a utilization value for the network link,
  - determining, with a power mode selection circuit, that the utilization value has fallen below a predetermined threshold,
  - responsive to the determination that the utilization value has fallen below the predetermined threshold, activating, with the power mode selection circuit, a power gated mode in the network link so that the power gated mode transmits data packets, that are not idle packets, at a reduced rate by power gating the network link,
  - subsequent to the activation of the power gated mode, transmitting through the network link and by a policy control module, data packets, that are not idle packets, at a reduced rate determined by the power gating of the network link,
  - subsequent to the transmission of the data packets, processing, by a first receiver, the data packets, that are not idle packets, that are being transmitted at the reduced rate determined by the power gating of the network link, and
  - responsive to the processing of the data packets that are not idle packets that are being transmitted at the reduced rate, configuring, by the policy control module, a communication network for the network link to operate at the reduced rate determined by the power gating of the network link, with the network link being operated at the reduced rate determined by the power gating of the network link to reduce the overall power consumption of an exascale computing system on which the network link operates.

6. The CPP of claim 5 further comprising:
determining, with the power mode selection circuit, that the utilization value has exceeded the predetermined threshold;
responsive to the determination that the utilization value has exceeded the predetermined threshold, activating, with the power mode selection circuit, the power gated mode in the network link so that the power gated mode transmits data packets, that are not idle packets, at an increased rate by power gating the network link; and
subsequent to the activation of the power gated mode, transmitting through the network link, data packets, that are not idle packets, at an increased rate determined by the power gating of the network link.

7. The CPP of claim 5 wherein the power gating includes speed gating.

8. The CPP of claim 5 wherein the power gating includes temporal gating.

9. A computer system (CS) for use with a network link that supports a plurality of data transmitting power modes, the CS comprising:
- a processor(s) set;
- a computer readable storage medium; and
- computer code stored on the computer readable storage medium, with the computer code including data and instructions for causing the processor(s) set to perform at least the following operations:
  - determining, with a utilization monitoring circuit, a utilization value for the network link,
  - determining, with a power mode selection circuit, that the utilization value has fallen below a predetermined threshold,
  - responsive to the determination that the utilization value has fallen below the predetermined threshold, activating, with the power mode selection circuit, a power gated mode in the network link so that the power gated mode transmits data packets, that are not idle packets, at a reduced rate by power gating the network link,
  - subsequent to the activation of the power gated mode, transmitting through the network link, data packets and by a policy control module, that are not idle packets, at a reduced rate determined by the power gating of the network link,
  - subsequent to the transmission of the data packets, processing, by a first receiver, the data packets, that are not idle packets, that are being transmitted at the reduced rate determined by the power gating of the network link, and
  - responsive to the processing of the data packets that are not idle packets that are being transmitted at the reduced rate, configuring, by the policy control module, a communication network for the network link to operate at the reduced rate determined by the power gating of the network link, with the network link being operated at the reduced rate determined by the power gating of the network link to reduce the overall power consumption of an exascale computing system on which the network link operates.

10. The CS of claim 9 further comprising:
determining, with the power mode selection circuit, that the utilization value has exceeded the predetermined threshold;
responsive to the determination that the utilization value has exceeded the predetermined threshold, activating, with the power mode selection circuit, the power gated mode in the network link so that the power gated mode transmits data packets, that are not idle packets, at an increased rate by power gating the network link; and
subsequent to the activation of the power gated mode, transmitting through the network link, data packets, that are not idle packets, at an increased rate determined by the power gating of the network link.

11. The CS of claim 9 wherein the power gating includes speed gating.

12. The CS of claim 9 wherein the power gating includes temporal gating.

* * * * *